Jan. 5, 1971    L. E. DUNLAP    3,552,805
ROLLER MOUNTING MECHANISM FOR TEMPLATE GUIDED TOOL
Original Filed June 24, 1968    2 Sheets-Sheet 1
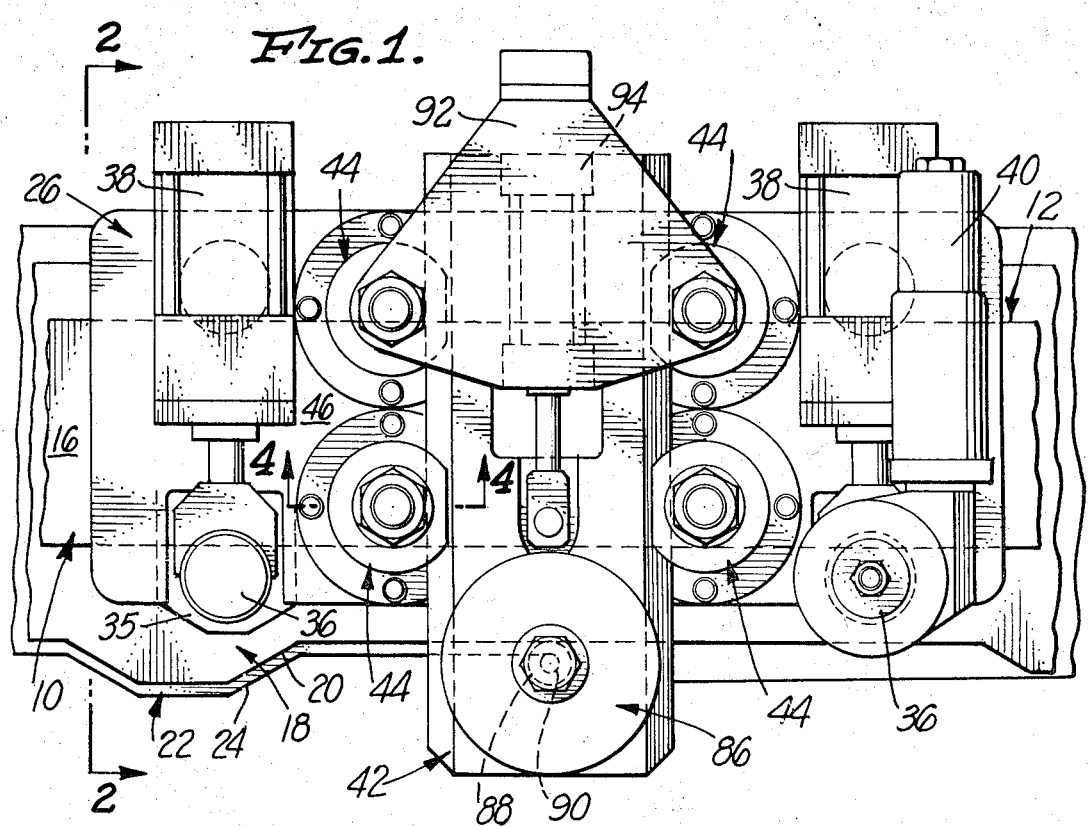
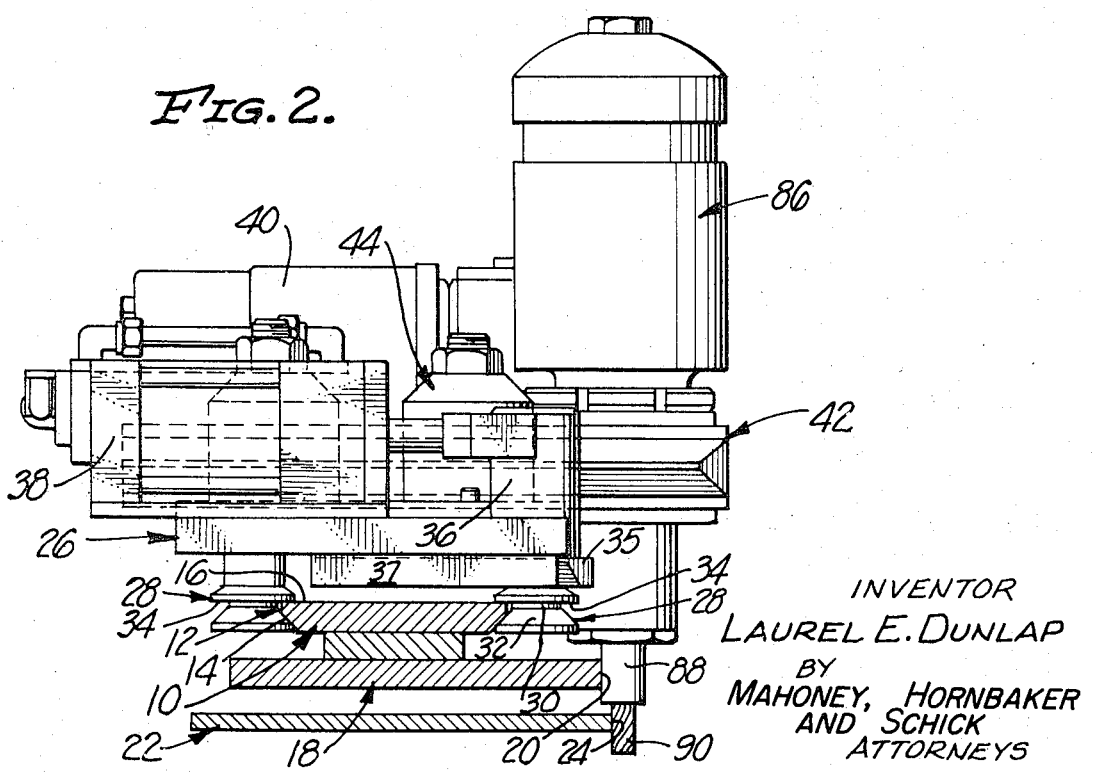
INVENTOR
LAUREL E. DUNLAP
BY
MAHONEY, HORNBAKER
AND SCHICK
ATTORNEYS

INVENTOR
LAUREL E. DUNLAP
BY
MAHONEY, HORNBAKER
AND SCHICK
ATTORNEYS

United States Patent Office 3,552,805
Patented Jan. 5, 1971

3,552,805
ROLLER MOUNTING MECHANISM FOR
TEMPLATE GUIDED TOOL
Laurel E. Dunlap, 4510 Mary Ellen Ave.,
Sherman Oaks, Calif. 91403
Original application June 24, 1968, Ser. No. 739,249.
Divided and this application Jan. 16, 1970, Ser.
No. 3,362
Int. Cl. F16c 29/06
U.S. Cl. 308—6                                      5 Claims

ABSTRACT OF THE DISCLOSURE

A supporting track has angular, longitudinal side edges engaged by angular roller surfaces on laterally spaced sets of supporting rollers to longitudinally movably support the carriage. Pressure cylinders constantly laterally urge the supporting rollers at one of the track sides toward said side for maintaining support roller gripping. Longitudinally spaced sets of guide roller assemblies on the carriage have V-shaped roller surfaces engaging mating roller surfaces on lateral side edges of a guide plate to support the guide plate laterally movable. Each roller assembly has independently adjustable upper and lower roller parts for aligning the guide plate. A template controls lateral movement of the guide plate and a tool thereon during longitudinal movement of the carriage along the supporting track.

CROSS-REFERENCE TO RELATED APPLICATION

This application is a division of my copending application Ser. No. 739,249, filed June 24, 1968, entitled Support Mechanism for Template Guided Tool.

BACKGROUND OF THE INVENTION

This invention relates to a support mechanism for a template guided tool, and more particularly to a uniquely roller-supported and roller-guided tool movable longitudinally along a template while said template determines lateral movement of said tool to determine the contour of a working operation along a workpiece. Even more particularly, this invention relates to a support roller concept involving constant pressure means acting against certain of the support rollers for maintaining all of the support rollers properly engaged and movable along a supporting track and also relates to a guide roller concept involving a series of guide roller assemblies which are uniquely adjustable for precise alignment of a tool mounting guide member movable along said guide roller assemblies.

In the fabrication of many manufactured products and assemblies, it is necessary to perform various working operations along parts of such assemblies. For instance, considering the modern aircraft industry, there are many occasions in the fabrication and assembly of modern aircraft where relatively large sheets of aluminum must have the side edges thereof formed with a predetermined contour including various recesses and projections. Further assuming that the size of the sheets and parts involved do not lend such metal working operations to the large press and other automatic manufacturing equipment, it is necessary to shape such sheet edges by use of the usual smaller rotating cutting tools.

Although these cutting operations can be performed by hand-guiding the particular cutting tool, it is obvious that such operations do readily lend themselves to template guided tools wherein the tool movements are determined by the template for exactly determining a predetermined working path of the tool along the sheet or part surface. With template guided tools of this character, once the guiding template is properly and accurately formed and the tool is properly mounted exactly movable according to the template contour, it is possible to continuously perform an entire series of working or cutting operations along a sheet or part edge in a completely automatic manner and without the necessity of depending on hand-guiding of the particular metal-working tool, whether a cutting tool or any other of the required working tools. The degree of accuracy of the working operation by the template-guided tool is, of course, directly dependent upon the combination of the accuracy with which the template is formed and the accuracy of the movement of the tool in following the template contour.

The accuracy of formation of the template is not particularly difficult or troublesome, but it is relatively difficult to mount the tool so that it will exactly follow the template contour while still being accurately carried along the parts upon which the working operations are being performed. Again, assume that a continuous series of working operations must be performed along a generally longitudinally extending edge of an aluminum sheet being fabricated for an aircraft assembly, not only must the tool be supported very accurately movable along the longitudinal path of the working operation, but the tool must also be very accurately guided and supported movable laterally of said working path and exactly following the previously determined contour of the template. In addition, since the template and the workpiece upon which the working operations are being performed must necessarily be respectively contacted by different parts of the tool, further exact alignments of the tool with both the template and the workpiece must be maintained.

The failings of most prior template guided tools for performing accurate working operations have been the result of improper movable supports therefor, both in the overall movement along the path of working operation, as well as the movement of the tool as determined by the contact with the guiding template. Furthermore, the supports for the prior template-guided tools have lacked the provision for the necessary adjustment of alignments of the tools relative to both the templates and the workpieces upon which the working operations are to be performed.

OBJECTS AND SUMMARY OF THE INVENTION

It is, therefore, an object of my invention to provide a support mechanism for a template-guided tool wherein the tool is mounted movable longitudinally along a general path of working operation by a unique form of supporting rollers which are arranged for securely gripping a supporting track in a manner insuring that the movement of the tool will be extremely true and accurate. Certain of said supporting rollers are arranged for constant pressure-urging of said rollers into engagement with surfaces of the supporting track, thereby insuring tight pressure gripping of all said supporting rollers with the respective supporting track surfaces. As a result, by forming the supporting track surfaces accurately, there is complete assurance that the tool movement along the path of working operation will be comparably accurate according to preset and predetermined conditions.

It is a further object of my invention to provide a support mechanism for a template-guided tool wherein the tool movement on the support mechanism for determined tool movement according to the template contour is extremely accurately guided and maintained aligned by a plurality or series of guide roller assemblies which not only permit initial presetting of accurate tool alignments, but also insure maintenance of such alignments throughout the working operation. The tool is supported on a guide member, which guide member is, in turn, roller-supported by a guide roller assemblies, and each of the guide roller assemblies is individually adjustable for presetting and maintaining accuracy of movement of the guide member and tool on said guide roller assemblies. The selective adjustment of each of the roller guide assemblies is provided by forming said assemblies of individually axially adjustable upper and lower roller parts supported and adjusted in a unique and relatively simple manner.

Thus, again, exact guided movement of the tool mounting guide plate is assured by the guide roller assemblies, and the accuracy of such movement is determined by the surfaces of said guide plate contacted by the guide roller assemblies. Also, in view of the individual adjustability of each of the guide roller assemblies, the alignment of the guide plate and, therefore, the tool, may be adjusted in virtually any direction so as to insure, with proper adjustment, exact alignment of the tool relative to the template and workpiece upon which the tool working operations are to be performed.

Other objects and advantages of the invention will be apparent from the following specification and the accompanying drawings, which are for the purpose of illustration only.

BRIEF DESCRIPTION OF THE DRAWINGS

FIG. 1 is a fragmentary, top plan view of a template-guided tool and the support mechanism therefor incorporating the combined principles of the present invention, said tool being positioned contacting and guided by an illustrative configuration of template and performing a working operation on an illustrative workpiece;

FIG. 2 is a vertical, sectional view looking in the direction of the arrows 2—2 in FIG. 1;

DESCRIPTION OF THE BEST EMBODIMENT CONTEMPLATED

Figure 3:
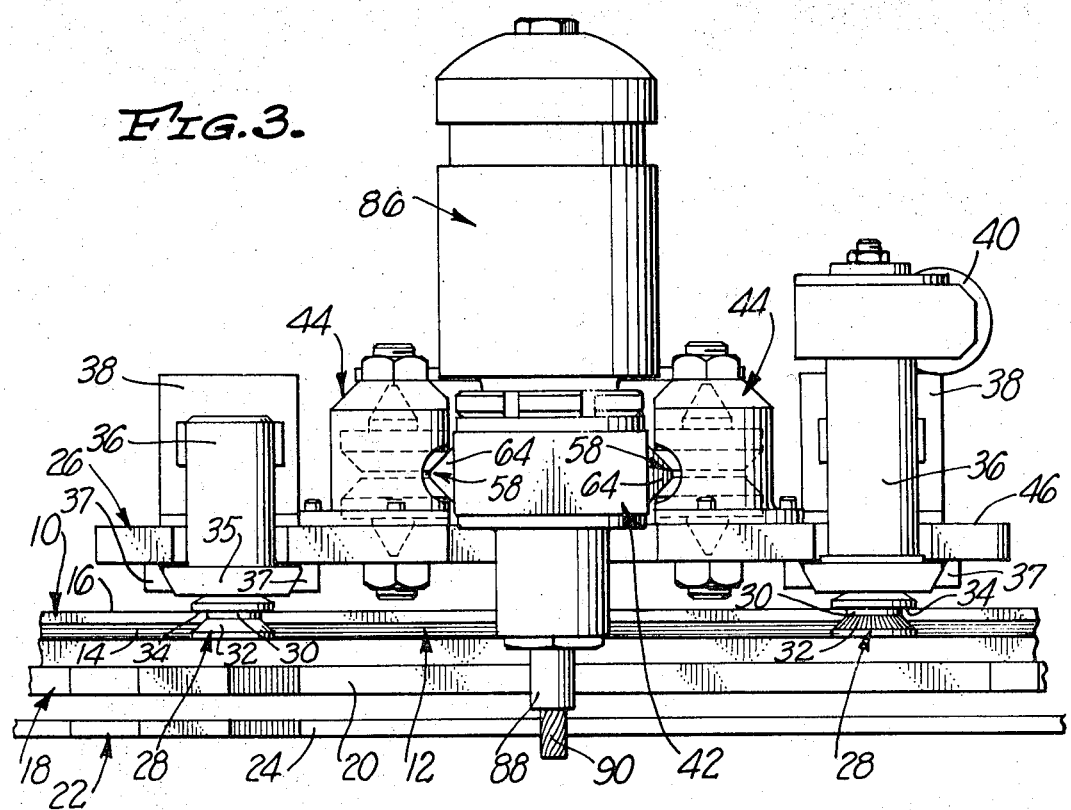
FIG. 3 is a fragmentary, front elevational view of the tool and support mechanism of FIG. 1.

Referring to the drawings, the embodiment of the support mechanism for a template guided tool illustrated includes a longitudinally extending supporting track, generally indicated at 10, having longitudinally extending and parallel, laterally spaced, side edge formed roller engaging surfaces, generally indicated at 12. As best seen in FIGS. 2 and 3, the roller engaging surfaces 12 are each formed with a laterally, outwardly and upwardly extending angled surface portion 14 and a horizontally flat surface portion 16, said angled and flat surface portions being the only effective surface portions of said roller engaging surfaces. Further, in this particular case, the supporting track 10 is positioned horizontal and has secured downwardly therefrom a usual template 18 having an edge, generally longitudinally extending and laterally configured, working path determining surface 20, said template being spaced above a similarly positioned workpiece 22 having a side working edge 24 underlying, but extending slightly laterally outwardly from the template working path determining surface.

A carriage, generally indicated at 26, is longitudinally movably supported above the supporting track 10 by longitudinally spaced sets of laterally spaced and preferably aligned supporting rollers 28, said rollers being rotatable in the same general plane of extension of the supporting track 10, that is, rotatable in a generally horizontal plane. The laterally opposite supporting rollers 28 of a given set oppositely laterally engage the roller engaging surfaces 12 of the supporting track 10, with roller surfaces, generally indicated at 30, comprised of an angles surface portion 32 and a horizontally flat surface portion 34 respectively mating to the angled surface portion 14 and the horizontally flat surface portion 16 of the roller engaging surfaces 12 on the supporting track 10. All of the supporting rollers 28 are mounted on and spaced downwardly from the carriage 26 rotatable relative to said carriage and the supporting track 10.

Important to certain of the principles of the present invention, however, the rearward supporting rollers 28 of each set are rotatably mounted on the carriage 26, with the axes thereof stationary, while the forward of the supporting rollers are mounted on the carriage, with the axes thereof laterally movable through cylindrical bearing carriages 36 extending upwardly through the carriage and supported through somewhat dovetail slides 35 laterally slidable in corresponding tracks 37 as shown in FIG. 3. Furthermore, the bearing cases 36 of said forward supporting rollers 28 are operably connected to pressure cylinders 38 mounted on the carriage 26 for constant pressure urging of said forward rollers laterally toward the rearward supporting rollers. The roller surfaces 30 of the forward supporting rollers 28 are thereby constantly pressure urged laterally into engagement with the roller engaging surfaces 12 of the supporting track 10 which, in effect, causes all of the roller surfaces of all of the supporting rollers to be constantly pressure urged into engagement with their respective roller engaging surfaces of the supporting track, insuring tight gripping and complete perfect engagement therebetween.

Any one of the supporting rollers 28 may be power driven to propel the carriage 26 longitudinally along the supporting track 10, and in this case the forward supporting roller at the right, as shown in FIGS. 1 and 3, is gear-connected in usual manner to a drive motor 40. Also, in order to insure proper driving between the particular of the supporting rollers 28 and the mating roller engaging surface 12 of the supporting track 10, the roller surface 30 thereof is slightly radially serrated, providing increased frictional engagement during the rotatable drive.

A generally horizontal tool-carrying and guide plate, generally indicated at 42, is mounted laterally movable over the longitudinally moving carriage 26 by a series or plurality of guide roller assemblies, generally indicated at 44. The guide roller assemblies 44 are preferably arranged in longitudinally aligned and spaced sets, which sets are laterally spaced and there being two of said sets. Furthermore, all of the guide roller assemblies 44 are substantially identical, and each is uniquely adjustable according to certain important principles of the present invention for exact alignment of the guide plate 42 laterally movable over the carriage 26.

Figure 4:
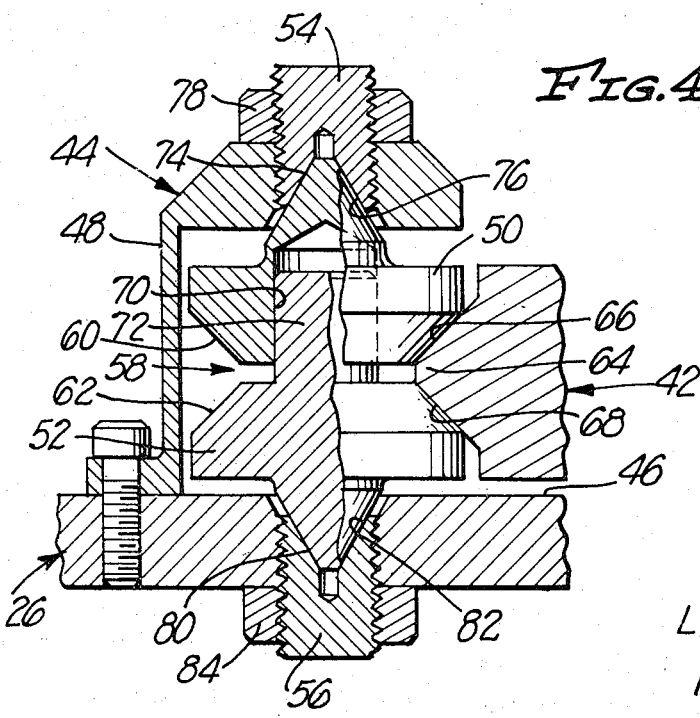
FIG. 4 is an enlarged, fragmentary, vertical, sectional view looking in the direction of the arrows 4—4 in FIG. 1.

The forward, left-hand guide roller assembly 44 is shown in detail in FIG. 4, and in view of the fact that all of the guide roller assemblies are identical, as stated, a description of this single guide roller assembly will suffice for all. As shown in FIG. 4, the guide roller assembly 44 is mounted on and with the major portion thereof projecting vertically upwardly from an upper surface 46 of the carriage 26. Also, the guide roller assembly 44 includes a partial housing 48, an upper roller part 50, a lower roller part 52, an upper bearing and adjustment screw 54 and a lower bearing and adjustment screw 56.

The upper and lower roller parts 50 and 52 combine to form a complete guide roller, generally indicated at 58, the upper roller part 50 having a downwardly inwardly angled roller surface 60 and the lower roller part 52 having an upwardly inwardly angled roller surface 62. Thus, the roller surfaces 60 and 62 of the upper and lower roller parts 50 and 52 combine to form a generally V-shaped overall roller surface circumferentially around the guide roller 58. Furthermore, the guide roller assembly 44 is positioned on the carriage 10, in a manner to be hereinafter described, so that such roller surfaces 60 and 62 contact a complementary or mating, generally V-shaped roller engagement surface at a side edge 64 of guide plate 42 formed by a laterally extending, downwardly outwardly angled upper roller engagement surface 66 and a similar, upwardly outwardly angled lower roller engagement surface 68 respectively mating with the roller surfaces 60 and 62 of the guide roller 58.

The upper roller part 50 includes a downwardly opening, coaxial, generally cylindrical recess 70 telescopically receiving an upwardly projecting, coaxial, generally cylindrical centering projection 72 of the lower roller part 52 telescopically therein. The centering projection 72 of the lower roller part 52 is axially slidable within the recess 70 of the upper roller part 50 so as to provide individual axial adjustment of the upper and lower roller parts relative to each other for axial adjustment of the roller surfaces 60 and 62 of the guide roller 58 in any manner desired.

The upper roller part 50 further includes an upwardly extending, coaxial, conical bearing surface portion 74 received upwardly in a downwardly opening, complementary, conical bearing and adjustment screw 54. The upper bearing and adjustment screw 54 is axially, threadably adjustably received through the housing 48 and is retained in axially adjusted position by a lock nut 78. The lower roller part 52 similarly includes a like configured and positioned conical bearing surface portion 80 received downwardly in a like conical bearing surface portion 82 in the lower bearing and adjustment screw 56, said lower bearing and adjustment screw being adjustably, threadably engaged downwardly through the carriage 26 and retained in axial adjustment by a lock nut 84.

Thus, the upper and lower bearing and adjustment screws 54 and 56, combined with the previously described telescopically interfitting recess 70 and centering projection 72, individually axially adjustably mount the upper and lower roller parts 50 and 52 on the carriage 26. At the same time, the upper and lower bearing and adjustment screws 54 and 56 rotatably mount the upper and lower roller parts 50 and 52 and, therefore, the overall guide roller 58 rotatable relative to the carriage 26 in a generally horizontal plane of rotation or a plane generally parallel to the plane of extension of the guide plate 42. In this manner all of the guide roller assemblies 44 through the cooperating engagement between the roller surfaces 60 and 62 of the guide roller 58 and the upper and lower roller engagement surfaces 66 and 68 of the guide plate 42 combine to support the guide plate laterally movable over the carriage 26. Also, in view of the separate and individual adjustability of the upper and lower roller parts 50 and 52, the lateral movement of the guide plate 42 is virtually universally predetermined and preset.

A somewhat conventional working tool, generally indicated at 86, is secured to the guide plate 42 extending downwardly transversely forwardly of the carriage 26, and has a rotatable, cylindrical template follower 88 engaged with and following the template working path determining surface 20. Also, a rotatable tool working member 90, in this case a cutting tool, extends coaxially downwardly through the template follower 88 into engagement with the side working edge 24 of the workpiece 22. The working tool 86 rotatably drives the tool working member 90 in the conventional manner for performing a working operation, while the lateral movement of both the working tool and tool working member are guided by the template follower 88, as will be hereinafter described.

A mounting plate 92, as best seen in FIG. 1, is secured stationary to the carriage 26 and extending laterally and longitudinally over the guide plate 42 by securement to upper portions of the laterally rearwardly set of guide roller assemblies 44. A fluid cylinder 94 is secured to the mounting plate 92 and is operably engaged with the guide plate 42 so as to constantly urge the guide plate laterally rearwardly on and exactly guided by the guide roller assemblies 44. The fluid cylinder 94 thereby constantly laterally rearwardly urges the template follower 88 into engagement with the template working path determining surface 20 and the tool working member 90 into engagement with the workpiece side working edge 24.

In operation, therefore, the drive motor 40 propels the entire carriage 26 and its assembly and the entire guide plate 42 and its assembly including the working tool 86 along the supporting track 10, the exact longitudinal path being determined by engagement of the carriage supporting rollers 28 with the side roller engaging surfaces 12 of the supporting track. At the same time, the template follower 88 of the working tool 86 exactly follows, both longitudinally and laterally, the contour of the working path determining surface 20 on the template 18 so as to precisely move the tool working member 90 of the working tool in a predetermined path against and working the side working edge 24 of the workpiece 22 as determined by the template. Exact alignment of the working tool template follower 88 and tool working member 90 for the precise proper lateral movement thereof according to the template working path determining surface 20 is preset and maintained by selective individual adjustment of the guide roller asemblies 44 guiding the lateral movement of the guide plate 42, as hereinbefore described.

Thus, according to the principles of the present invention, a support mechanism for a template guided tool is provided wherein the working tool 86 is carried in an exact longitudinal working path by the supporting rollers 28 laterally engaged with the supporting track 10, said lateral engagement between the supporting rollers and supporting track being precisely mantained by constant lateral pressure means on certain of the supporting rollers, urging all of the supporting rollers into the supporting track engagement. At the same time, the working tool 86 is precisely guided along the longitudinal and lateral working path for performing a working operation on the workpiece 22 by the template 18, the precise alignment of the working tool in lateral movement during said working operation being preset and maintained by the uniquely, individually adjustable guide roller assemblies 44. Each of the guide roller assemblies 44 is not only individually adjustable, one assembly relative to the other, but also, the upper and lower roller parts 50 and 52 are each individually, axially adjustable relative to each other in each of the individual guide roller assemblies.

It is pointed out that the unique principles of pressure engagement of the supporting rollers 28 with the supporting track 10 and the unique principles of individual adjustability of the guide roller assemblies 44 are both separately and in combination applicable to many other types of support mechanisms and for many advantageous purposes other than that specifically shown and described herein. It is not intended to limit, therefore, the various principles of the present invention other than to the extent clearly set forth in the appended claims when broadly construed.

I claim:

1. In a roller mounted member, the combination of: a member having opposite parallel roller engagement surfaces; a plurality of roller assemblies, carriage means mounting said roller assemblies adjacent to and oppositely roller-engaging said member engagement surfaces; and each of said roller assemblies including axially aligned upper and lower roller parts mounted independently axially movable relative to said carriage means and member and combining to form roller surfaces engaged with one of said member engagement surfaces, bearing means mounting said roller parts rotatable relative to said carriage means and member comprising conical bearing surfaces coaxial of each of said roller parts mating between said roller parts and said carriage means, selectively operable adjustment means for independently adjusting each of said roller parts relative to said carriage means and member comprising threaded means between each of said roller parts and said carriage means and having said carriage means conical bearing surfaces formed thereon.

2. A roller mounted member as defined in claim 1 in which said roller assembly upper and lower roller parts combine to form angularly opposed roller surfaces engaged with mating engagement surfaces of said member.

3. A roller mounted member as defined in claim 1 in which said plurality of roller assemblies includes spaced sets of roller assemblies engaging each of said member engagement surfaces, said sets of roller assemblies being aligned between said member engagement surfaces.

4. A roller mounted member as defined in claim 1 in which said roller assembly roller parts are axially telescoped and axially movable relative to each other.

5. A roller mounted member as defined in claim 1 in which said plurality of roller assemblies includes spaced sets of roller assemblies engaging each of said member engagement surfaces, said sets of roller assemblies being aligned between said member engagement surfaces; in which said roller assembly upper and lower roller parts combine to form angularly opposed roller surfaces engaged with mating engagement surfaces of said member; and in which said roller assembly roller parts are axially telescoped and axially movable relative to each other.

References Cited

UNITED STATES PATENTS 2,106,216   1/1938   Johnson _____ 308—3A

FRED C. MATTERN, Jr., Primary Examiner

FRANK SUSKO, Assistant Examiner